United States Patent
Gilda et al.

(10) Patent No.: US 10,558,519 B2
(45) Date of Patent: Feb. 11, 2020

(54) POWER-REDUCED REDUNDANT ARRAY OF INDEPENDENT MEMORY (RAIM) SYSTEM

(71) Applicant: INTERNATIONAL BUSINESS MACHINES CORPORATION, Armonk, NY (US)

(72) Inventors: Glenn D. Gilda, Binghamton, NY (US); Patrick J. Meaney, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 267 days.

(21) Appl. No.: 15/407,465

(22) Filed: Jan. 17, 2017

(65) Prior Publication Data

US 2018/0203627 A1     Jul. 19, 2018

(51) Int. Cl.
| | |
|---|---|
| *G06F 11/10* | (2006.01) |
| *G06F 11/14* | (2006.01) |
| *G06F 3/06* | (2006.01) |
| *G06F 1/3234* | (2019.01) |

(52) U.S. Cl.
CPC ........ *G06F 11/1004* (2013.01); *G06F 1/3275* (2013.01); *G06F 3/0625* (2013.01); *G06F 3/0659* (2013.01); *G06F 3/0683* (2013.01); *G06F 11/1076* (2013.01); *G06F 11/1088* (2013.01); *G06F 11/14* (2013.01)

(58) Field of Classification Search
CPC .............. G06F 11/1004; G06F 1/3275; G06F 11/1088; G06F 3/0625; G06F 3/0659; G06F 3/0683; G06F 11/1076; G06F 11/14

USPC ..... 714/764, 768, 769, 770, 773, 6.22, 6.24, 714/25, 42, 48; 365/227, 185.09, 200, 365/201

See application file for complete search history.

(56) References Cited

U.S. PATENT DOCUMENTS

| | | | | |
|---|---|---|---|---|
| 6,052,818 | A * | 4/2000 | Dell | G06F 11/10 714/763 |
| 6,269,431 | B1 * | 7/2001 | Dunham | G06F 11/1469 707/999.202 |
| 6,353,878 | B1 * | 3/2002 | Dunham | G06F 11/1456 707/999.009 |
| 6,366,987 | B1 * | 4/2002 | Tzelnic | G06F 11/1451 711/112 |
| 7,603,526 | B2 * | 10/2009 | VanStee | G06F 13/161 711/137 |
| 8,140,751 | B1 | 3/2012 | Wang | |
| 8,615,679 | B2 | 12/2013 | Smith et al. | |
| 10,318,378 | B2 | 6/2019 | Hoei et al. | |
| 2003/0023825 | A1 | 1/2003 | Woo et al. | |
| 2004/0210722 | A1 * | 10/2004 | Sharma | G06F 12/0817 711/144 |

(Continued)

*Primary Examiner* — John J Tabone, Jr.
(74) *Attorney, Agent, or Firm* — Cantor Colburn LLP; Margaret McNamara

(57) ABSTRACT

Embodiments include techniques used for a power-reduced redundant array of independent memory RAIM system. The technique includes blocking commands to one or more memory modules of the RAIM system and reading data from one or more unblocked memory modules. The technique also includes applying a power channel mark for one or more blocked memory modules, the power channel mark indicating the one or more blocked memory modules to a decoder for error correction.

18 Claims, 8 Drawing Sheets

(56) References Cited

U.S. PATENT DOCUMENTS

| | | | | |
|---|---|---|---|---|
| 2004/0225944 | A1* | 11/2004 | Brueggen | G06F 11/1064 |
| | | | | 714/758 |
| 2004/0236901 | A1* | 11/2004 | Briggs | G06F 13/1668 |
| | | | | 711/105 |
| 2008/0163032 | A1* | 7/2008 | Lastras-Montano | |
| | | | | G06F 11/1044 |
| | | | | 714/785 |
| 2008/0250270 | A1* | 10/2008 | Bennett | G06F 11/1068 |
| | | | | 714/6.13 |
| 2009/0098901 | A1* | 4/2009 | Norman | G06F 12/0238 |
| | | | | 455/550.1 |
| 2009/0228668 | A1* | 9/2009 | Borkenhagen | G06F 12/08 |
| | | | | 711/161 |
| 2011/0320918 | A1* | 12/2011 | Alves | G06F 11/1044 |
| | | | | 714/784 |
| 2013/0191682 | A1* | 7/2013 | Gower | G06F 11/1044 |
| | | | | 714/6.1 |
| 2014/0195727 | A1* | 7/2014 | Xu | G06F 13/1668 |
| | | | | 711/103 |
| 2015/0143024 | A1 | 5/2015 | Luo et al. | |
| 2015/0143199 | A1* | 5/2015 | Chinnakkonda Vidyapoornachary | |
| | | | | G06F 1/3275 |
| | | | | 714/768 |
| 2015/0143200 | A1* | 5/2015 | Chinnakkonda Vidyapoornachary | |
| | | | | G06F 1/3275 |
| | | | | 714/770 |
| 2018/0060168 | A1* | 3/2018 | Kelly | G06F 11/1076 |
| 2018/0067806 | A1* | 3/2018 | Dodson | G06F 11/1048 |

\* cited by examiner

| DIMM Power Component | DIMM Power | Prior Art | Invention |
|---|---|---|---|
| Fixed Power (e.g. refresh, DC power, etc.) | 4w | 20w | 20w |
| Store Power (@ 10% bw) | 8w | 40w | 40w |
| Fetch Power (@ 20% bw) | 16w | 80w | 64w |
| Total | 28w | 140w | 124w (11% less) |

POWER-REDUCED REDUNDANT ARRAY OF INDEPENDENT MEMORY (RAIM) SYSTEM

BACKGROUND

The present invention relates to computer memory, and more specifically, to a power-reduced redundant array of independent memory (RAIM) system.

Memory device densities continue to grow as computer systems have become more powerful. Redundant array of independent memory (RAIM) systems have been developed to improve performance and to increase the availability of storage systems. RAIM distributes data across several independent memory modules where each memory module contains one or more memory devices. With an increase in storage, there comes an increase in store and fetch operations for processing the data. Store and fetch operations consume a substantial portion of power within the memory system. While increasing the storage capacity of the memory system, the power utilization of the system should be managed to increase the operability of the system.

SUMMARY

According to an embodiment, a computer-implemented method for power-reduced RAIM system is provided.

Embodiments include a computer-implemented method for operation of a power-reduced redundant array of independent memory RAIM system. The computer-implemented method includes blocking commands to one or more memory modules of the RAIM system and reading data from one or more unblocked memory modules. The computer-implemented method also includes applying a power channel mark for one or more blocked memory modules, the power channel mark indicating the one or more blocked memory modules to a decoder for error correction.

Embodiments also include a computer program product for operating a power-reduced redundant array of independent memory (RAIM) system, the computer program product includes a computer readable storage medium having stored thereon first program instructions executable by a processor to cause the processor to block commands to one or more memory modules of the RAIM system. The instructions are further executable to cause a processor to read data from one or more unblocked memory modules, and apply a power channel mark for one or more blocked memory modules, the power channel mark indicating the one or more blocked memory modules to a decoder for error correction.

Embodiments includes a power-reduced redundant array of independent memory (RAIM) system, the system includes one or more memory modules, a decoder, marking logic module, a processor, and a storage medium, the storage medium being coupled to a processor. The system also includes the processor configured to block commands to one or more memory modules of the RAIM system, read data from one or more unblocked memory modules, and apply a power channel mark for one or more blocked memory modules, the power channel mark indicating the one or more blocked memory modules to a decoder for error correction.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 6 is a table for a power-reduced RAIM system in accordance with an embodiment.

DETAILED DESCRIPTION

In accordance with embodiments of the disclosure, methods, systems and computer program products for a power-reduced RAIM system.

The technique described herein is related to reducing power consumption in a redundant array of independent memory RAIM system. In one or more embodiments, power channel marking allows for reduced power consumption within the memory system when there are no errors with the retrieved data or memory channel issues. In the event that other memory devices are not marked or indicated as potentially faulty, power channel marking can be enabled to recover data from less than all of the memory devices of the memory system. In an embodiment, one of the memory devices can be marked with a power channel mark. In an embodiment, a fetch command is blocked from the memory module and memory channel, thereby conserving energy. In an example, the RAIM system includes five custom RAIM DIMMs having five memory channels.

During a store process, data and data slices are stored to each of the five DIMMs. In addition, during a data fetch process, the data is retrieved from each of the five DIMMs based on the address information provided in the associated fetch command. The technique disclosed herein allows for storing to all five DIMMs while performing the fetch process from only four of the five DIMMs. In an embodiment, the fetch power will remain active for the four memory channels that are retrieving the data and the last memory channel will remain idle/inactive resulting in a power savings. Channel marking allows for power savings by reducing the power consumed by the memory channels. The power channel mark provides a decoder with data indicating which channels to provide error correction for based on the addresses for the data to be retrieved.

This technique also provides for marking the suppressed channel. In one or more embodiments, the ECC decoder requires the information for processing the active channels and information regarding which channels can be ignored based on the power channel mark. The ECC decoder must be able to perform the error correction function based on the remaining channels and modify the ECC accordingly. In an embodiment, the power channel mark informs the ECC decoder with information for performing the decoding on the remaining channels. For example, if four DIMMs of a five DIMM configuration is used, the ECC decoder is told to ignore the errors for a memory channel because the retrieved data from each memory module includes data regarding the other memory modules which is used during error correction. In an embodiment, the power channel mark is applied to the 5$^{th}$ memory channel.

In the event that an error exists, the power channel marking will be disabled and all of the memory modules and memory channels will be accessed. During this event, the error correction will be performed for each of the memory modules.

Figure 1:
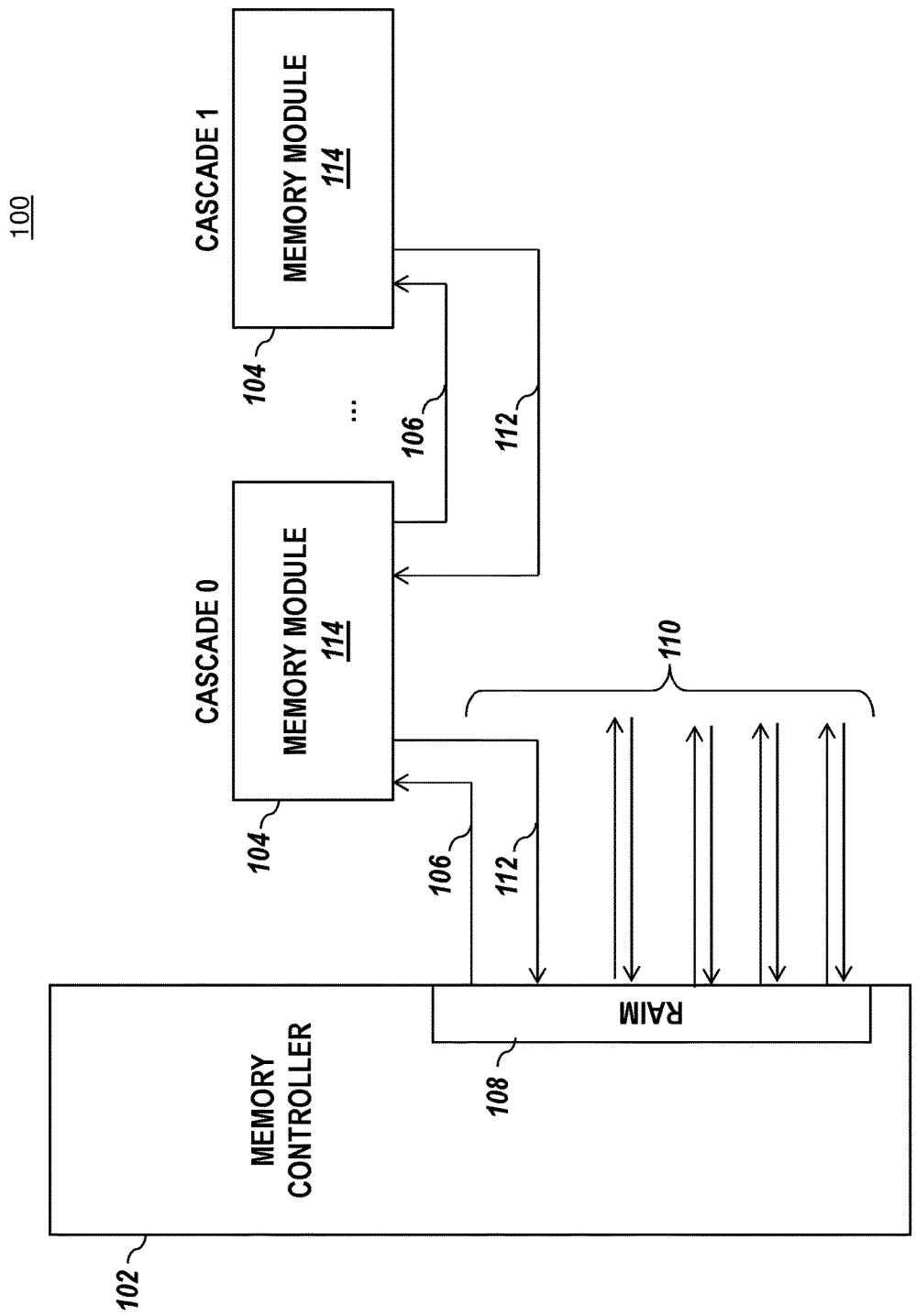
FIG. 1 is a block diagram illustrating one example of a memory system for practice of the teachings herein.

FIG. 1 illustrates a block diagram of a cascade interconnect memory system that may be implemented by an embodiment. The memory system depicted in FIG. 1 includes multiple independent memory interface busses 110 that are logically aggregated together to operate in unison to support a single independent access request from a memory controller 102. The servicing of the single independent access request includes data and error detection/correction information distributed or "striped" across the memory interface busses 110 and associated memory devices located on the memory modules 104 by a RAM module 108. The RAM module 108 coordinates the striping of data and ECC across each of the parallel memory interface buses 110. An embodiment also includes CRC error detection being performed on data being transferred on the memory interface busses 110 between the memory controller 102 and the memory modules 104. In an embodiment, memory is not cascaded.

As shown in the embodiment depicted in FIG. 1, the memory controller 102 attaches to five narrow/high speed point-to-point memory interface busses 110, with each of the memory interface buses 110 connecting one of five memory controller interface channels to a cascade interconnect memory module 104 (or memory subsystem). In an embodiment, each memory module 104 includes at least one hub device 114 and one or more memory devices. In another embodiment, there is a hub device that is outside of the actual memory module 104 (as would be the case with so-called industry standard DIMMs). As depicted in FIG. 1, the memory interface busses 110 operate in unison to support an access request from the memory controller. In an embodiment, there may exist a multiplicity of outstanding fetch and store requests to the multiple cascades in the memory subsystem.

Each of the memory interface buses 110 in the embodiment depicted in FIG. 1 includes an upstream bus 112 and a downstream bus 106. One of the functions provided by the memory modules 104 (e.g., a hub device 114 located on the memory module 104) is a re-drive function to send signals on the upstream bus 112 to the memory controller 102 or on the downstream bus 106 to other memory modules 104. In an embodiment, two or more memory modules 104 are cascade connected to each of the memory interface buses 110. In an embodiment, the memory interface buses 110 are implemented using differential clock and data signals (i.e., each clock and data signal requires two wires).

In an embodiment, the downstream bus 106 includes thirty-two wires to support: one clock signal, thirteen data/command signals (or bits), one general purpose spare lane (which can be used to spare a clock or a data/command signal), and one spare data/command lane. In this embodiment, each data packet is transferred over the downstream bus 106 in twelve beats and includes eighteen CRC bits. In an embodiment, the upstream bus 112 includes forty-six wires to support: one clock signal, twenty data/command signals, one general purpose spare lane (which can be used to spare a clock or a data/command signal), and one spare data/command lane. In this embodiment, each data packet is transferred over the upstream bus 112 in eight beats and includes sixteen CRC bits.

In an embodiment, the downstream bus 106 includes thirty-four wires to support: one clock signal, fourteen data/command signals (or bits), two general purpose spare lanes (which can be used to spare up to two data/command signals), and one spare-lane-signaling lane (to manage dynamic spare lane protocols). In this embodiment, each data packet is transferred over the downstream bus 106 in sixteen beats and includes twenty-five CRC bits. In an embodiment, the upstream bus 112 includes thirty-four wires to support: one clock signal, fourteen data/command signals, two general purpose spare lanes (which can be used to spare up to two data/command signals), and one spare-lane-signaling lane (to manage dynamic spare lane protocols). In this embodiment, each data packet is transferred over the upstream bus 112 in sixteen beats and includes thirty-two CRC bits. In an embodiment, the upstream bus 112 includes forty-eight wires to support: one clock signal, twenty-one data/command signals, two general purpose spare lanes (which can be used to spare up to two data/command signals), and one spare-lane-signaling lane (to manage dynamic spare lane protocols). In this embodiment, each data packet is transferred over the upstream bus 112 in sixteen beats and includes thirty-two CRC bits.

As used herein, the term "RAIM" refers to redundant arrays of independent memory modules (e.g., dual in-line memory modules or "DIMMs). In a RAIM system, if one of the memory channels fails (e.g, a memory module in the channel), the redundancy allows the memory system to use data from one or more of the other memory channels to reconstruct the data stored on the memory module(s) in the failing channel. The reconstruction is also referred to as error correction.

In an embodiment, the memory system depicted in FIG. 1 is a RAIM memory system and the five channels are lock step channels (i.e., the five memory interface buses 110 are accessed in unison with each other). The RAIM module 108 in an implementation has the property that one of the channel's data is the bitwise XOR of the other four channels' data. Additional checks are included in order to correct for additional errors. As used herein, the term "mark" refers to an indication given to an ECC that a particular symbol or set of symbols of a read word are suspected to be faulty. The ECC can then use this information to enhance its error correction properties.

In an embodiment, when a per-rank channel mark is placed, the RAIM ECC can correct at least one unknown bit error (and sometimes an entire unknown chip error), depending on how many additional chip marks (suspected chip errors) are in place in the rank. At most one channel in each rank may be marked at any given time by a per-rank channel mark.

In accordance with an embodiment, if an error is caught by the channel CRC, then a temporary global channel mark can be placed which will allow the RAIM ECC to correct additional possible errors. This global channel mark will cause the per-rank channel marks to be removed as only one channel within each rank may be marked at any given time. Memory channel failure may require replacement, but the integrity of the concurrently accessed data is not destroyed (i.e., the error is a correctable error or a "CE") by the failure of a single memory channel. Upon a memory channel being marked (global or per-rank) any subsequent reads are calculated from the distributed parity such that the memory channel failure is masked from the end user (i.e., the marked memory channel is ignored).

As used herein, the term "correctable error" or "CE" refers to an error that can be corrected while the system is operational, and thus a CE does not cause a system outage. As used herein, the term "uncorrectable error" or "UE" refers to an error that cannot be corrected while the memory system is operational, and thus presence of a UE may cause a system outage or a job abends/restarts, during which time the cause of the UE can be corrected (e.g., by replacing a memory device, by replacing a memory module, recalibrating an interface, taking defective memory locations offline). In an embodiment, a non-memory UE (e.g. when a CRC failure occurs) can be possibly recovered by retrying the fetch operation. In an embodiment, a "non-memory special ue" tag is associated with the data to indicate that a re-fetch of the data from the host should be attempted, resulting in a likely correction on the retry. In an embodiment, a "non-memory special ue" tag is associated with fetch data which had a ue in response to a power mark channel blocked fetch command.

As used herein, the term "coincident" refers to the occurrence of two (or more) error patterns or error conditions that overlap each other in time. In one example, a CE occurs and then later in time, before the first CE can be repaired, a second failure occurs. The first and second failure are said to be coincident. Repair times are always greater than zero and the longer the repair time, the more likely it would be to have a second failure occur coincident with the first. Some contemporary systems attempt to handle multiple failing devices by requiring sparing a first device or module. This may require substantially longer repair times than simply using marking, as provided by embodiments described herein. Before a second failure is identified, embodiments provide for immediate correction of a memory channel failure using marking, thus allowing an additional correction of a second failure. Once a memory channel failure is identified, an embodiment provides correction of the memory channel failure, up to two marked additional memory devices and a new single bit error. If the system has at most one marked memory device together with the marked channel, then an entire new chip error can be corrected. The words "memory channel failure" utilized herein, includes failures of the communication medium that conveys the data from the memory modules 104 to the memory controller 102 (i.e., through one of the memory interface buses 110), in addition to possible memory hub devices and registers.

Figure 2:
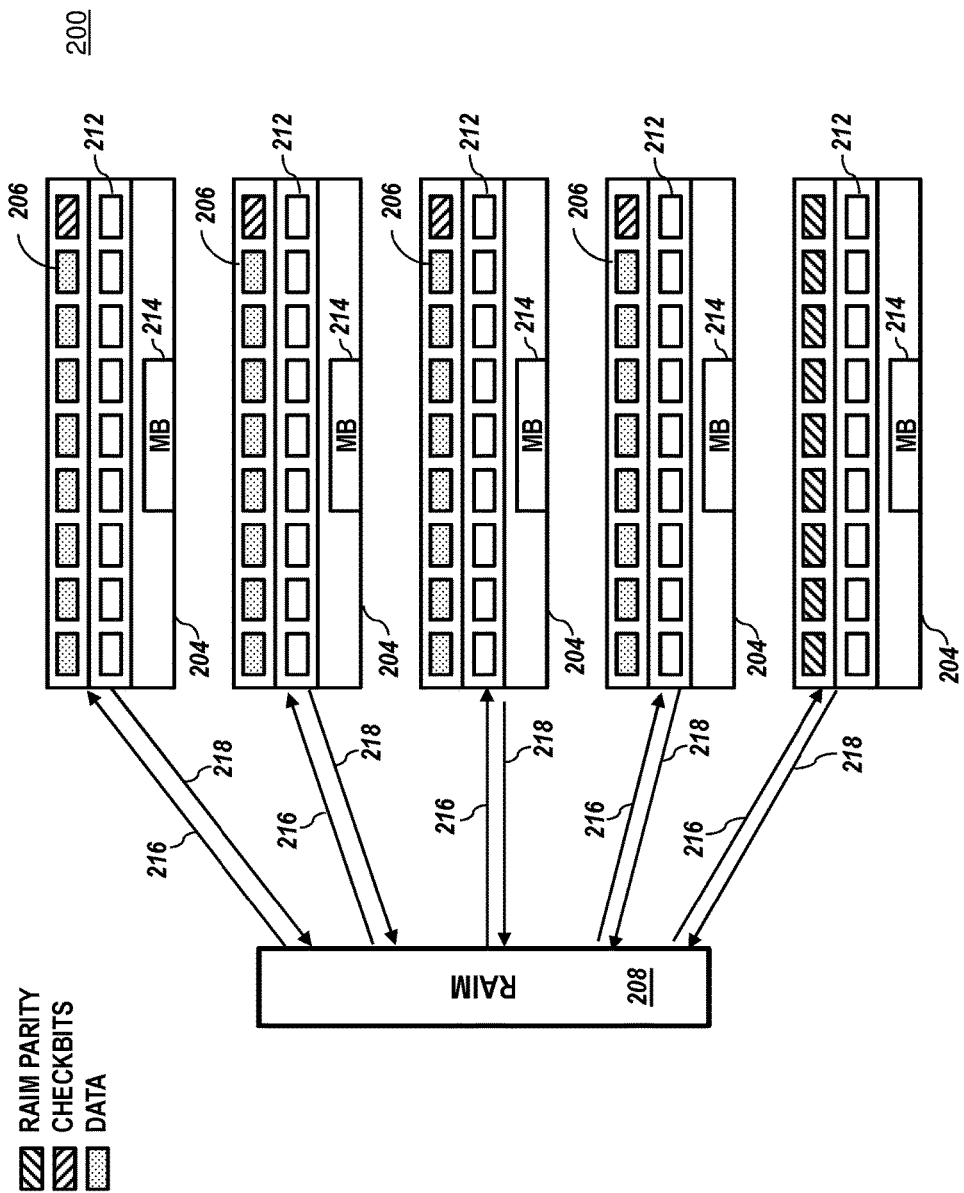
FIG. 2 is a block diagram illustrating a power-reduced RAIM system in accordance with an embodiment.

FIG. 2 illustrates a memory system in accordance with an embodiment. The memory system includes a RAIM controller 208 that is in communication with five DIMMs 204 via memory interface buses (downstream 216; upstream 218). Each DIMM 204 includes a memory buffer device 214 as well as two ranks 206 212 of memory devices. In this example, a first rank 206 includes nine memory devices and a second rank 212 includes nine memory devices. As shown in FIG. 2, the first rank 206 on one of the DIMMs 204 includes RAIM parity data, and one memory device from the first rank 206 on each of the each of the other four channels includes checkbits. The parity data and check bits are used for ECC as is known in the art.

Embodiments described herein are not limited to the memory system configurations shown in FIG. 1 and FIG. 2. Embodiments may be implemented on any memory system configurations known in the art. Another memory system configuration where embodiments may be implemented includes a memory system with DIMMs that have a planar hub chip.

Figure 3:
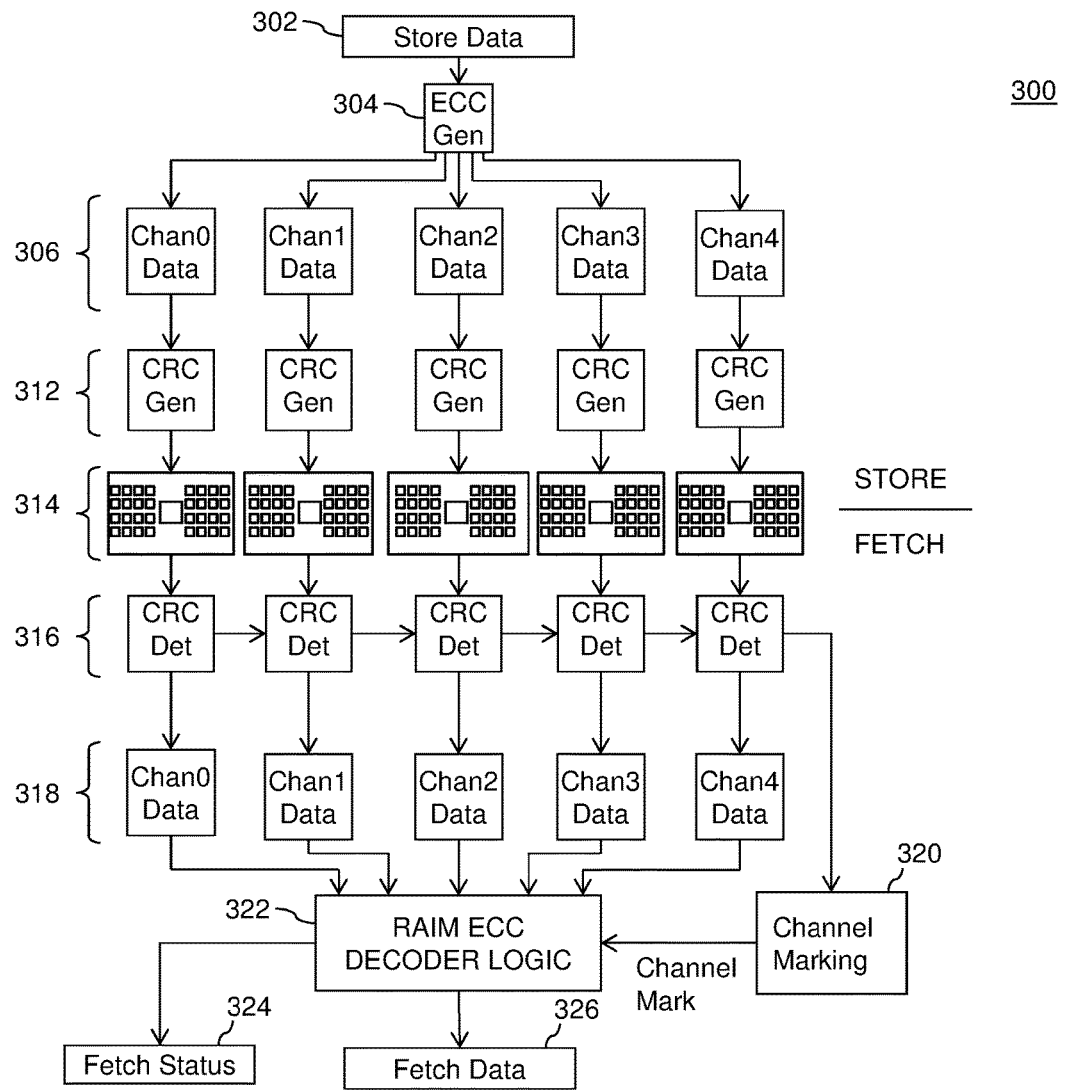
FIG. 3 is a block diagram illustrating a power-reduced RAIM system in accordance with an embodiment.

FIG. 3 illustrates a block diagram of a RAIM store and fetch path that implements both ECC and CRC implemented in accordance with an embodiment. In an embodiment, the store path is implemented by hardware and/or software located on the memory controller 102. In addition, the store path may be implemented by hardware and/or software instructions located on a memory module 104 (e.g., in a hub device/memory buffer on the memory module). The RAIM configuration depicted in FIG. 3 has some similarities to a RAID 5 configuration (i.e., striped disks with dedicated parity), although as described earlier in reference to FIG. 1, a RAIM ECC code may be implemented that includes additional checks that are stored that allow for functionality well beyond the RAID 5 capabilities. As depicted in FIG. 3, data from the five channels are combined in a way that protects data against loss of any one memory channel (e.g., a memory module 104).

In the RAIM store path depicted in FIG. 3, the ECC generator 304 receives store data 302 and outputs five groupings of channel data 306 that include ECC checkbits. The channel data 306 are input to individual CRC generators 312. The combination of the ECC checkbits and RAIM parity bits are the overall checkbits of the RAIM ECC. The channel data 306 are input to the CRC generators 312 to generate CRC bits for the channel data 306. Output from the CRC generators 312 (including CRC and data bits) are then output to the downstream bus 106 (or 216) for transmission to the memory modules 314. As shown in FIG. 3, the data being stored on the memory modules 314 are supplemented by ECC. In an embodiment, the CRC bits are used for bus protection and are not stored, but are regenerated on memory modules 314 when fetch data is being returned on the fetch path.

In an embodiment, the fetch path is implemented by hardware and/or software located on the memory controller 102. In addition, the fetch path may be implemented by hardware and/or software instructions located on a memory module 104 (e.g., in a hub device on the memory module). As shown in FIG. 3, the RAIM fetch path includes receiving data on an upstream bus 112 (or 218) from the memory modules 314. The CRC detectors 316 depicted in FIG. 3 are utilized to detect a channel error, and to temporarily mark a failing channel.

The output from the CRC detectors 316 are the channel data 318, which include data and ECC bits that were generated by an ECC generator, such as ECC generator 304. In addition, the CRC detectors 316 output data to the marking logic 320 (also referred to herein as a "marking module") to indicate which channels are in error. In an embodiment the marking logic 320 generates marking data indicating which channels and memory devices are marked. The marking data tracks global channel marks, CRC marks, per-rank channel marks, power channel marks, and DRAM marks. The channel data 318 and the marking data are input to RAIM ECC decoder module 322 where channel data 318 are analyzed for errors which may be detected and corrected using the RAIM ECC and the marking data received from the marking logic 320. The output from the RAIM ECC decoder module 322 are the corrected data 326 (in this example 64 bytes of fetched data) and a fetch status 324. Embodiments provide the ability to have soft errors present (e.g., failing memory devices) and also channel failures or other internal errors without getting UEs. Embodiments also provide for parity or ECC or other protection on the corrected output data 326 as understood in the art. Data from the five channels are combined in a way that protects data against loss of any one memory channel. In one or more embodiments, the marking logic 320 provides information to the RAIM ECC decoder module 322 indicating which four of the five channels to use during the fetch operation when power channel marking is enabled.

Figure 4:
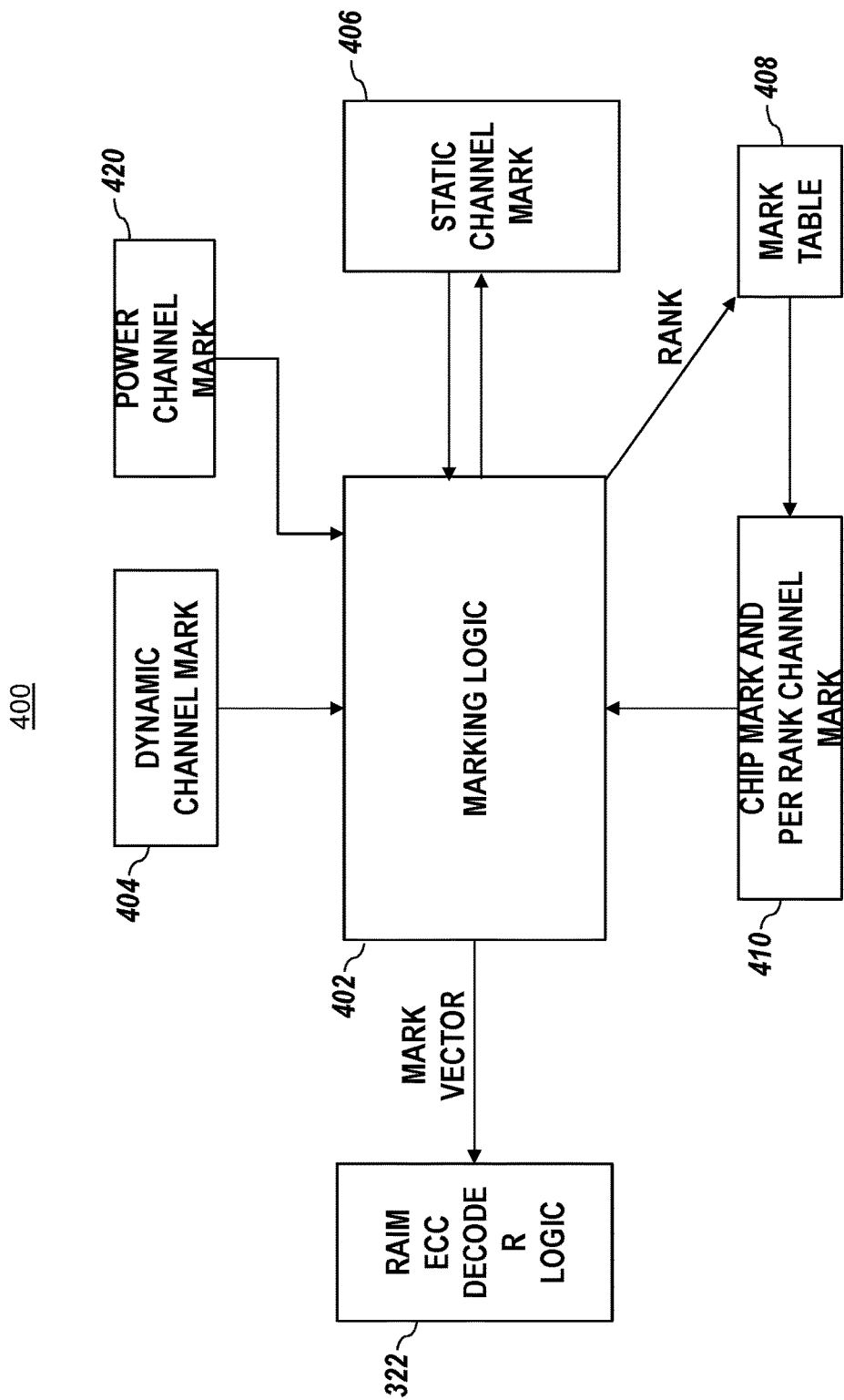
FIG. 4 is a block diagram illustrating a power-reduced RAIM system in accordance with an embodiment.

FIG. 4 illustrates a block diagram of marking logic in accordance with an embodiment. In an embodiment, the marking logic illustrated in FIG. 4 is executed in the marking logic 320 of FIG. 3. In an embodiment, the marking logic 402 receives dynamic channel marking data 404. In an embodiment the global dynamic channel marking data 404 is received from the CRC detectors 316 of FIG. 3. The CRC detectors 316 detect errors at each of the channels and dynamically flag them as faulty until a data recovery occurs. Once data validation and recovery occur, such as from a fetch retry or scrubbing process, the flags are removed. In an embodiment, the global dynamic channel marking data 404 is a vector of bits. In one embodiment the global dynamic channel marking data 404 is a 5-bit vector indicating which of the 5 channels have been dynamically marked. In an embodiment the global dynamic channel marking data 404 is used to correct data without a data recovery.

In an embodiment, the marking logic 402 additionally receives static channel mark data 406. The static channel mark data 406 indicates the channels that have permanent errors and need to be replaced. The static channel mark data 406 includes data for entire channels (corresponding to global channel marks). In an embodiment the static channel mark data 406 is updated by marking logic 402. Marking logic 402 can be implemented in hardware, software, firmware, or any combination of hardware, software, or firmware. In an embodiment the mark table 408 tracks all of the per-rank channel marks and chip marks for each rank of the memory.

In an embodiment, the marking logic 402 also receives mark data 410. In an embodiment, the chip mark data 410 is stored in the mark table 408. In an embodiment of the mark table 408, a rank is supplied to the table to enable look-up of the chip marks. In an embodiment, the chip mark data 410 is a vector of data indicating which, if any, memory devices in the given rank have been marked. In an embodiment, the chip mark data 410 includes an x mark indicating a first marked chip, and a y mark indicating a second marked chip. In an embodiment, the per-rank channel mark data 410 are stored in the mark table 408. In an embodiment of the mark table 408, a rank is supplied to the table to enable look-up of the per-rank channel marks. In an embodiment, the per-rank channel mark data 410 is a vector of data indicating which, if any, channels need to be blocked by the marking logic 402. The marking logic 402 combines the results of all of the data and calculates if any of the channels should be marked with a per-rank channel mark or with a global channel mark. In an embodiment, chip marks are freed up in a marked channel (global or per-rank) based on logic as will be described in more detail below. If the marking logic 402 calculates that a channel mark (global or per-rank) is appropriate, it updates the static channel mark table 406 (global) or mark table 408 (per-rank). The marking logic 402 supplies a mark vector indicating the hardware channels (global and within a rank) and memory devices that have been marked to the RAIM ECC decoder logic 322 which uses the data to efficiently correct any errors in the data.

In an embodiment, the marking logic 402 receives power channel mark data 420. The power channel mark data 420 is allowed to mark a channel in the absence of any other channel mark for data retrieved from memory. In an embodiment, channels that are marked with the power channel marks are blocked and do not receive a fetch command to retrieve the data. Because the channel does not receive a fetch command, there will be no power from the memory system that is utilized during a fetch operation for the marked channel. If a data error or mark is determined in the memory system, power channel marking will be disabled and the data recovery will be performed using all of the channels. The marking logic 402 supplies a mark vector indicating the hardware channels and memory devices that have been marked to the RAIM ECC decoder logic 322 which will use the information to correct any errors in the data. Specifically, the RAIM ECC decoder logic 322 must account for the memory channel that is indicated with a power channel mark. In an embodiment, the ECC for a five DIMM RAIM configuration, the ECC code must reflect the updated ECC for the four active memory channels because the fifth memory channel is no longer utilized in the data fetch operation when it is indicated with a power channel mark. The RAIM ECC decoder logic 322 must have the proper ECC information for the active channels to properly determine whether errors exist in the fetched data.

Figure 5A:
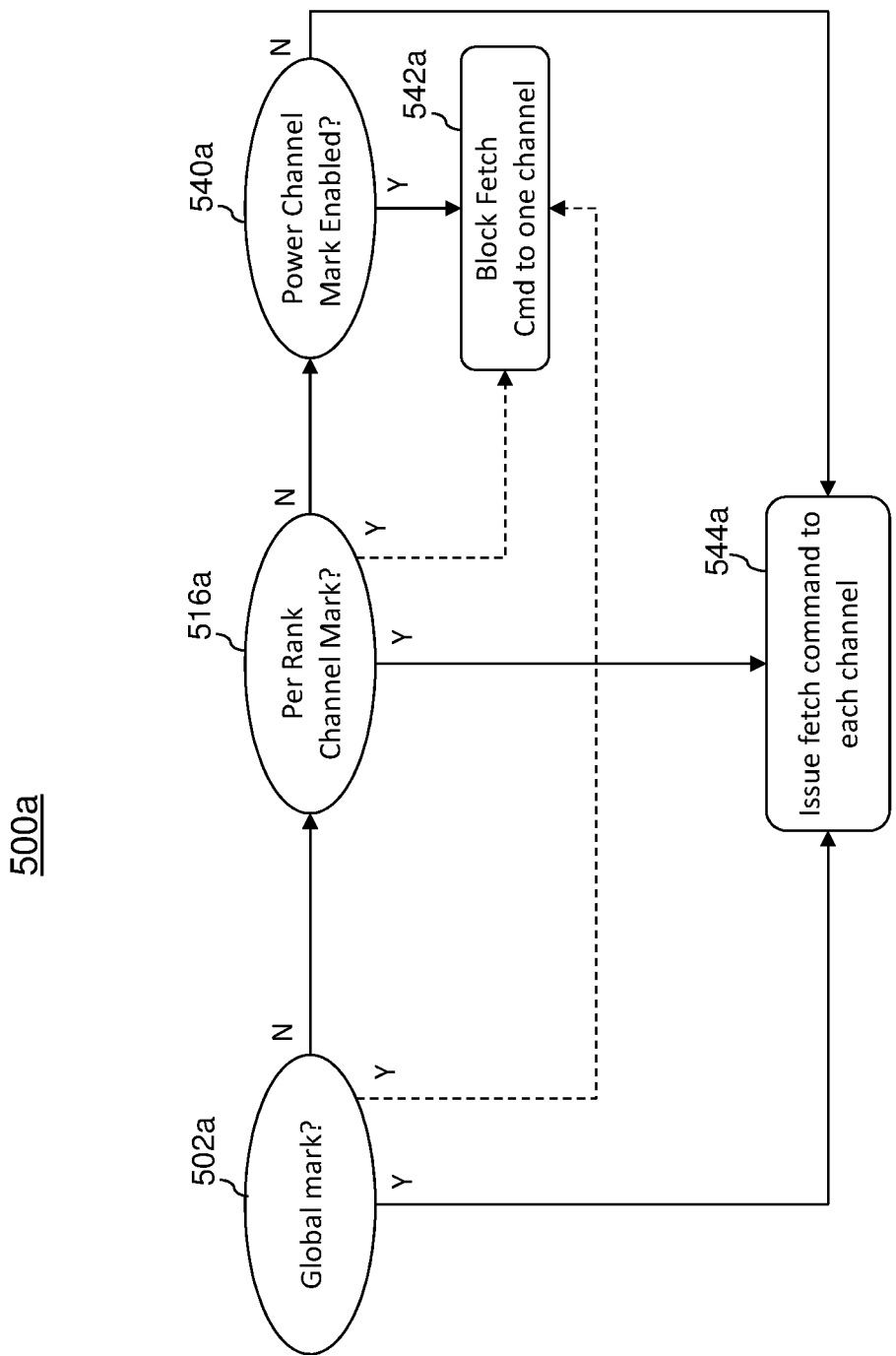
FIG. 5a and FIG. 5b are flow charts illustrating a method for power-reduced RAIM system in accordance with an embodiment.

FIG. 5a illustrates a power-reduced RAIM memory in accordance with an embodiment. At block 502a, prior to a memory fetch operation, it is determined if a global mark will be applied to the channel (e.g., if the channel has failed numerous attempts at recovery due to clock failures, overflow of failing data lanes, solid CRC failures, etc.). If it is determined that the global mark will be applied to a channel, then processing continues at block 544a where the fetch command is issued to all channels. If it is determined at block 502a that the global mark will not be applied to the channel, then processing continues at block 516a where it is determined if a per-rank channel mark will be applied to protect a portion of a channel against an overflow of bad DRAMs within a rank. If it is determined that a per-rank channel mark will be applied to the channel, then processing continues at block 544a where the fetch command is issued to all channels. If it is determined at block 516a, that a per-rank channel mark will not be applied to the channel, then processing continues at block 540a where it is determined if power channel marking is enabled. Processing continues at block 542a to block a fetch command to one channel. Responsive to receiving a fetch command, only the four remaining unblocked memory modules will receive the fetch command to retrieve the data from the memory modules. In one or more embodiments, power channel marking will be disabled when two or more channels have been marked. In such a scenario, power channel marking is disabled because it results in an uncorrectable error. If power channel marking is not enabled at block 540a, then processing continues to block 544a where the fetch command is issued to all channels. In one or more embodiments, the blocking of the fetch command to save power can only be used when the other DIMMs or memory channels are not marked. In an embodiment, if the command is not blocked for the fetch operation, power will still be used and no power savings will be realized. In an embodiment, if it is determined at block 502a that the global mark will be applied to the channel, then processing continues at block 542a (as indicated by the dashed line) to block a fetch command to one channel (i.e. the channel with the global mark). In an embodiment, if it is determined at block 516a that a per-rank channel mark will be applied to the channel, then processing continues at block 542*a* (as indicated by the dashed line) to block a fetch command to one channel (i.e. the channel with the per-rank channel mark).

Figure 5B:
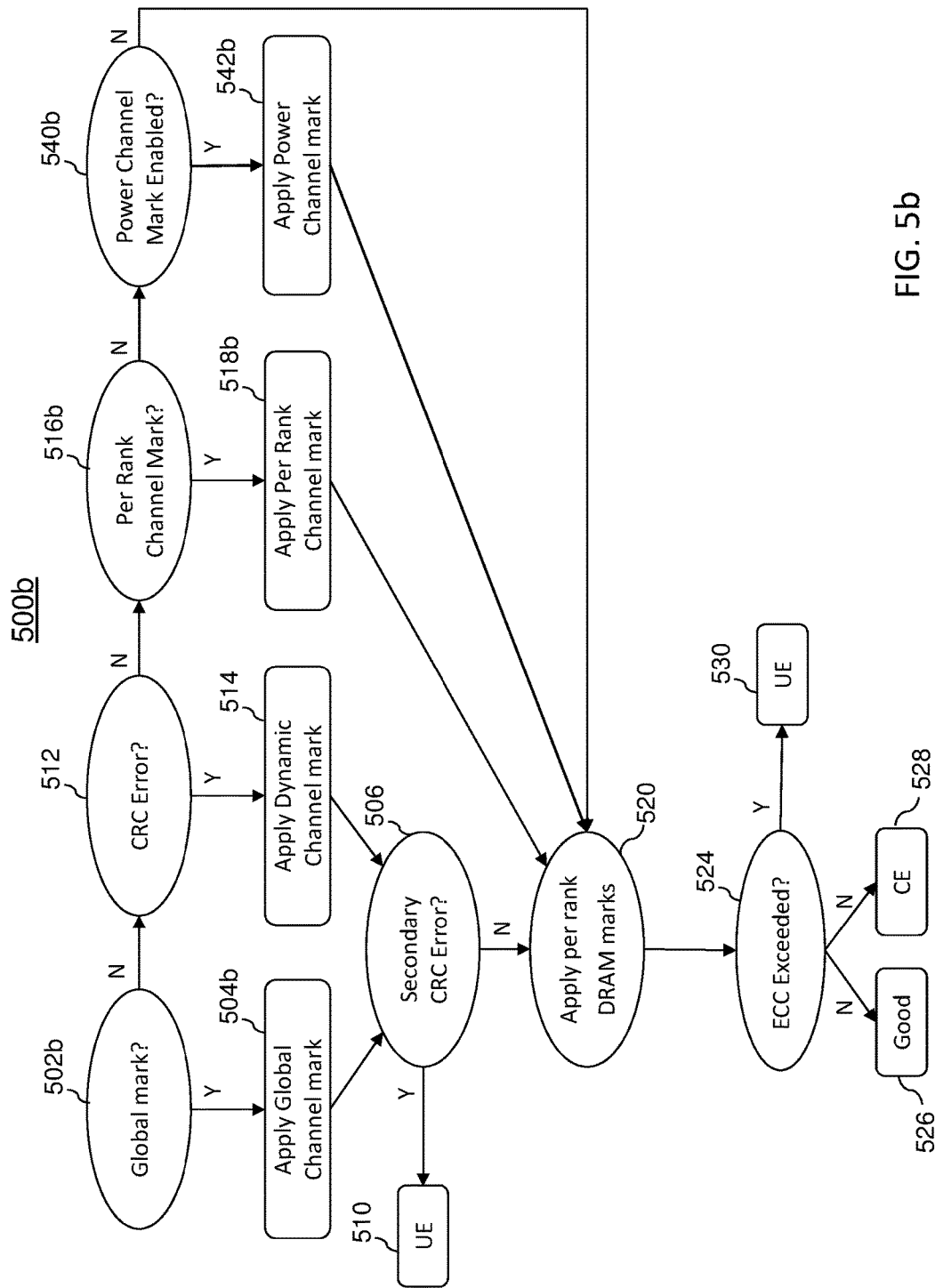

FIG. 5*b* illustrates a power-reduced RAIM memory in accordance with an embodiment. At block 502*b*, it is determined if a global mark should be applied to the channel (e.g., if the channel has failed numerous attempts at recovery due to clock failures, overflow of failing data lanes, solid CRC failures, etc.). If it is determined that the global mark should be applied to a channel, then processing continues at block 504*b* where a global channel mark is applied to the channel. Processing then continues at block 506 where it is determined if a secondary CRC error has been identified by the CRC detectors. If a secondary CRC error has been identified on another channel, then an UE is detected at block 510. Otherwise processing continues at block 520, where per rank DRAM chip marks, if any, are applied. Processing then continues at block 524 where the RAIM ECC decoder logic decodes the data and determines if the ECC capability of the memory system has been exceeded. If the ECC capability has been exceeded then an UE is detected at block 530. Otherwise either the data is good as shown at block 526 or any errors are CEs as shown at block 528.

If it is determined at block 502*b* that the global mark should not be applied to the channel, then processing continues at block 512 where it is determined if a CRC error has been detected by the CRC detectors. If a CRC error has been detected, then processing continues at block 514 where a dynamic channel mark is applied to protect the channel data during the CRC error window. Typically, global, permanent marks are applied for previously known or discovered bad channels while CRC temporary marks are applied on sudden, unexpected errors in those channels. In an embodiment, after a certain threshold of failed recovery and CRC errors, a CRC mark will be turned into a global permanent mark by code or hardware. Processing then continues at block 506 where it is determined if a secondary CRC error has been identified by the CRC detectors. If a secondary CRC error has been identified, then an UE is detected at block 510. Otherwise processing continues at block 520, where per rank DRAM chip marks, if any, are applied. Processing then continues at block 524 where the RAIM ECC decoder logic decodes the data and determines if the ECC capability of the memory system has been exceeded. If the ECC capability has been exceeded then an UE is detected at block 530. Otherwise either the data is good as shown at block 526 or any errors are CEs as shown at block 528.

If it is determined at block 512, that a CRC error has not been detected, then processing continues at block 516*b* where it is determined if a per-rank channel mark should be applied to protect a portion of a channel against an overflow of bad DRAMs within a rank. If it is determined that a per-rank channel mark should be applied to the channel, then processing continues at block 518*b* and a per-rank channel mark is applied to the channel. Processing continues at block 520, where per rank DRAM chip marks, if any, are applied. Processing then continues at block 524 where the RAIM ECC decoder logic decodes the data and determines if the ECC capability of the memory system has been exceeded. If the ECC capability has been exceeded then an UE is detected at block 530. Otherwise either the data is good as shown at block 526 or any errors are CEs as shown at block 528.

If it is determined at block 516*b*, that a per-rank channel mark has not been applied to the channel, then processing continues at block 540*b* where it is determined if power channel marking is enabled. Processing continues at block 542*b* to apply a power channel mark, if it is determined that power channel marking is enabled. In an embodiment, application of a power channel mark 542*b* is applied to a channel that had a blocked fetch from block 542*a*. In one or more embodiments, power channel marking will be disabled when two or more channels have been marked. In such a scenario, power channel marking is disabled because it results in an uncorrectable error.

If power channel marking is not enabled at block 540*b*, then processing continues at block 520, where per rank DRAM chip marks, if any, are applied. Processing then continues at block 524 where the RAIM ECC decoder logic decodes the data and determines if the ECC capability of the memory system has been exceeded. If the ECC capability has been exceeded then an UE is detected at block 530. Otherwise either the data is good as shown at block 526 or any errors are CEs as shown at block 528.

FIG. 6 illustrates a table of power-reduced RAIM memory in accordance with an embodiment. The table 602 provides an example of a low power RAIM memory 128 GB DDR3 DIMM. The table 602 includes DIMM power components including Fixed Power (e.g. refresh, DC power, etc.), Store Power, and Fetch Power. In one or more embodiments, the store bandwidth is approximately ½ the fetch bandwidth.

In this example, DIMM Power for Fixed power is 4 watts (w). For a 5 DIMM configuration, 20 w of power is used. DIMM Power for Store Power utilizing 10% of the bandwidth is 8 w. For a 5 DIMM configuration, 40 w of power is used. DIMM power for Fetch Power utilizing 20% of the bandwidth is 16 w. For a 5 DIMM configuration, 80 w of power is used. According to one or more embodiments, blocking the fetch command for retrieving data from the DIMM will result in a power savings. In this example, for a 5 DIMM configuration blocking the fetch command results in Fetch Power utilization of 64 w. The total power utilization as provided for a DIMM is 28 w and for a 5 DIMM configuration the total power is 140 w. The power savings realized according to an embodiment results in total power utilization of 124 w (power savings of 11%).

Figure 7:
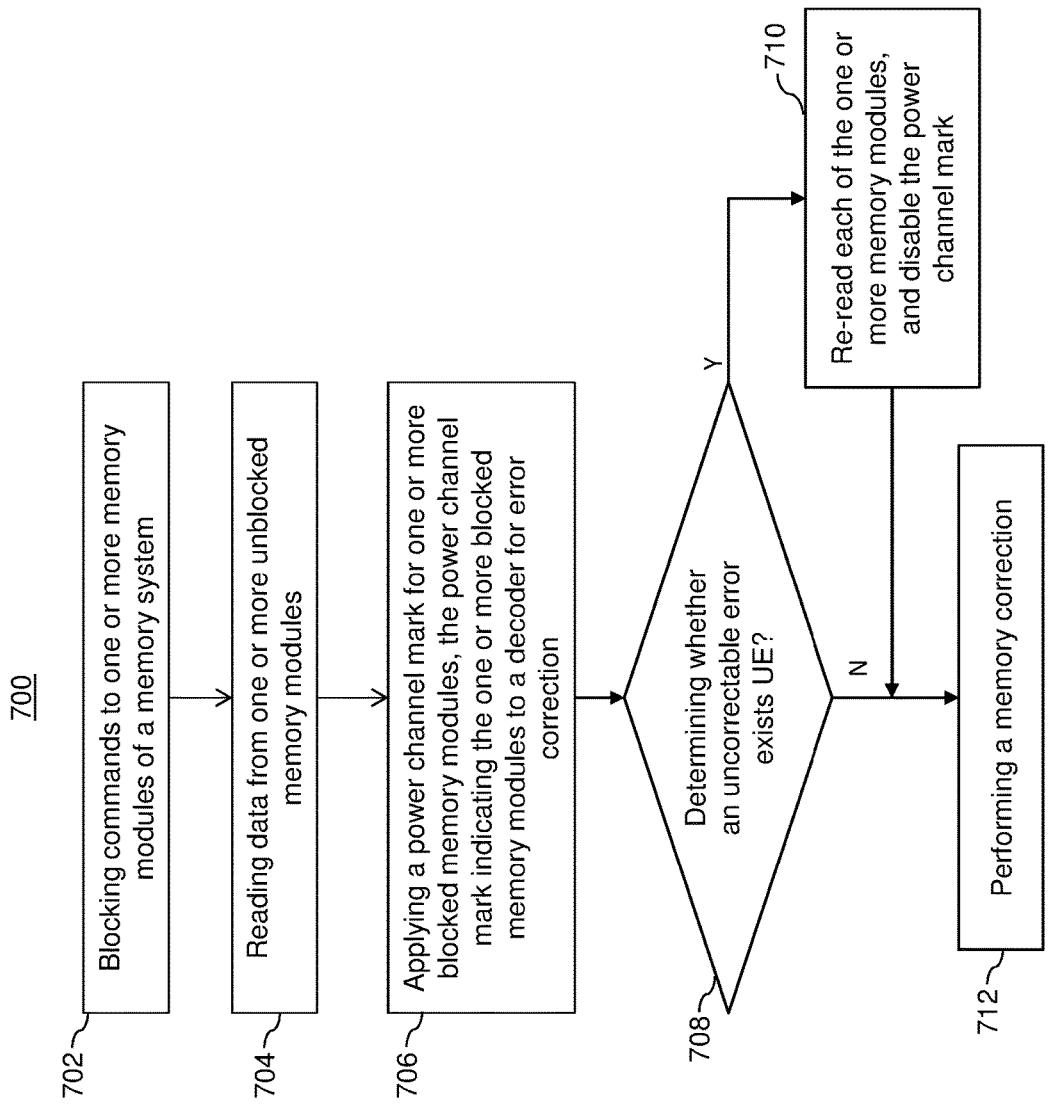
FIG. 7 is a flow chart for a method for a power-reduced RAIM system in accordance with an embodiment.

FIG. 7 provides a flow diagram of a method 700 for power-reduced RAIM system. Block 702 provides blocking commands to one or memory modules of a memory system. In one or more embodiments, the command that is blocked is the fetch command. In one or more embodiments the memory modules can comprise a dual in-line memory modules.

Block 704 provides reading from one or more unblocked memory modules. In one or more embodiments, the data is read from the remaining memory modules that have not been blocked. The slices of data can be retrieved from the unblocked memory modules and the fetch power for the blocked memory module is conserved.

Block 706 provides applying a power channel mark for one or more blocked memory modules, the power channel mark indicating the one or more blocked memory modules to a decoder for error correction. In one or more embodiments, the power channel mark is used to correct blocked data from the blocked memory modules in the blocked channel. Subsequently, memory channels that receive a power channel mark will not receive power in data fetch operation.

If, after applying a power channel mark 706, an uncorrectable error (UE) is present 708, memory recovery occurs, which consists of a re-read of all of the memory modules with powered channel marking disabled 710. Operation proceeds with RAIM memory error correction 712. In one or more embodiment, the error correction can be any known error correction technique in the art. If there is no UE present 708, operation proceeds with RAIM memory error correction 712.

In an embodiment, power channel marking is disabled when errors (e.g. CRC, ECC, etc.) and/or other channels marks (e.g. global, per-rank, hierarchical marks, etc.) are present in memory system. If other errors or channels marks have been determined the power channel marking will be disabled and the fetch operation will be re-performed to recover the data.

In one or more embodiments, a hierarchical priority scheme is used for managing channel marks to avoid double marked uncorrectable error UE scenarios. In the event that two or more memory channels are marked, the data will not be able to be recovered in a five DIMM RAIM system. The three remaining DIMMs will not provide enough redundancy to recover the data.

As described above, embodiments can be embodied in the form of computer-implemented processes and apparatuses for practicing those processes. An embodiment may include a computer program product on a computer readable/usable medium with computer program code logic containing instructions embodied in tangible media as an article of manufacture. Exemplary articles of manufacture for computer readable/usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for power-reduced operation of a redundant array of independent memory (RAIM) system, the method comprising:
    marking one or more memory modules of the RAIM system with a power channel mark based on determining an error associated with received commands;
    blocking the commands to one or more memory modules based on the error;
    reading data from one or more unblocked memory modules of the one or more memory modules, responsive to blocking the commands to one or more memory modules; and
    providing the power channel mark to a decoder for error correction, wherein no power is supplied to the one or more blocked memory modules based on the power channel mark.

2. The computer-implemented method of claim 1, wherein the blocked command is a fetch command and the fetch command is provided to a memory controller to retrieve data from one or more memory modules.

3. The computer-implemented method of claim 1, further comprising disabling the blocking when non-power channel marks are present, wherein the non-power channel marks comprise global channel marks, per-rank channel marks, and/or hierarchical channel marks.

4. The computer-implemented method of claim 1, further comprising responsive to determining errors in data retrieved from the one or more memory modules are present, disabling the power channel mark and re-performing a fetch to recover data in based on the errors.

5. The computer-implemented method of claim 4, wherein the errors comprise CRC errors.

6. The computer-implemented method of claim 1, comprising using a hierarchical priority scheme for managing channel marks to prevent multiple simultaneous channel marks resulting in uncorrectable errors.

7. The computer-implemented method of claim 1, further comprising updating an error correction code supplied to the decoder based on the power channel mark.

8. A power-reduced redundant array of independent memory (RAIM) system, the system comprising
    a processor;
    a non-transitory computer-readable storage medium, the non-transitory computer-readable storage medium being coupled to the processor;
    the processor configured to:
        mark one or more memory modules of the RAIM system with a power channel mark based on determining an error associated with received commands;
        block the commands to the one or more memory modules based on the error;
        read data from one or more unblocked memory modules of the one or more memory modules, responsive to blocking the commands to one or more memory modules; and
        provide the power channel mark to a decoder for error correction, wherein no power is supplied to the one or more blocked memory modules based on the power channel mark.

9. The system of claim 8, wherein the blocked command is a fetch command and the fetch command is provided to a memory controller to retrieve data from one or more memory modules.

10. The system of claim 8, the processor being further configured to disable the blocking when non-power channel marks are present, wherein the non-power channel marks comprise global channel marks, per-rank channel marks, and/or hierarchical channel marks.

11. The system of claim 8, further comprising responsive to determining errors in data retrieved from the one or more memory modules are present, the processor being further configured to disable the power channel mark and re-perform a fetch to recover data in the presence of the errors.

12. The system of claim 11, wherein the errors comprise CRC errors.

13. The system of claim 8, the processor being further configured to use a hierarchical priority scheme for managing channel marks to prevent multiple simultaneous channel marks resulting in uncorrectable errors.

14. The system of claim 8, the processor further configured to update an error correction code based on the power channel mark.

15. A computer program product for operating a power-reduced redundant array of independent memory (RAIM) system, the computer program product comprising:
  a non-transitory computer readable storage medium having stored thereon first program instructions executable by a processor to cause the processor to:
    mark one or more memory modules of the RAIM system with a power channel mark based on determining an error associated with received commands;
    block the commands to one or more memory modules based on the error;
    read data from one or more unblocked memory modules of the one or more memory modules, responsive to blocking the commands to one or more memory modules; and
    provide the power channel mark to a decoder for error correction, wherein no power is supplied to the one or more blocked memory modules based on the power channel mark.

16. The computer program product of claim 15, wherein the instructions are further executable by a processor to cause the processor to disable the blocking when non-power channel marks are present, wherein the non-power channel marks comprise global channel marks, per-rank channel marks, and/or hierarchical channel marks.

17. The computer program product of claim 15, wherein the instructions are further executable by a processor to cause the processor to responsive to determining errors in data retrieved from the one or more memory modules are present, disable the power channel mark and re-perform a fetch to recover data in the presence of the errors.

18. The computer program product of claim 15, wherein the instructions are further executable by a processor to cause the processor to update an error correction code based on the power channel mark.

* * * * *